(12) United States Patent
Wissing et al.

(10) Patent No.: US 11,967,885 B2
(45) Date of Patent: Apr. 23, 2024

(54) COMBINATION BRAKE-GENERATOR INVERTED MOTOR

(71) Applicants: INDUCTIVE VENTURES LLC, Marietta, GA (US); Andrew Wissing, Marietta, GA (US); Tony Morris, Marietta, GA (US); Geoff Wissing, Greenville, SC (US); Kent Davey, Edgewater, FL (US)

(72) Inventors: Andrew Wissing, Marietta, GA (US); Tony Morris, Marietta, GA (US); Geoff Wissing, Greenville, SC (US); Kent Davey, Edgewater, FL (US)

(73) Assignee: INDUCTIVE VENTURES, LLC, Marietta, GA (US)

( * ) Notice: Subject to any disclaimer, the term of this patent is extended or adjusted under 35 U.S.C. 154(b) by 871 days.

(21) Appl. No.: 16/981,348

(22) PCT Filed: Apr. 17, 2019

(86) PCT No.: PCT/US2019/027889
§ 371 (c)(1),
(2) Date: Sep. 16, 2020

(87) PCT Pub. No.: WO2019/204455
PCT Pub. Date: Oct. 24, 2019

(65) Prior Publication Data
US 2021/0067001 A1 Mar. 4, 2021

Related U.S. Application Data

(60) Provisional application No. 62/659,747, filed on Apr. 19, 2018.

(51) Int. Cl.
*H02P 3/14* (2006.01)
*H02K 1/2791* (2022.01)
(Continued)

(52) U.S. Cl.
CPC ......... *H02K 7/1846* (2013.01); *H02K 1/2791* (2022.01); *B60L 7/28* (2013.01);
(Continued)

(58) Field of Classification Search
CPC ............. H02P 2201/09; H02K 7/1846; H02K 1/2791; H02K 2213/03; B60L 2200/10; B60L 2200/44
See application file for complete search history.

(56) References Cited

U.S. PATENT DOCUMENTS 5,894,902 A    4/1999  Cho
6,285,103 B1   9/2001  Fukada
(Continued)

FOREIGN PATENT DOCUMENTS

DE         2501762 A1    7/1976

OTHER PUBLICATIONS

Search Report in co-pending, related PCT Application No. PCT/US2019/027889, dated Aug. 28, 2019.

*Primary Examiner* — Karen Masih
(74) *Attorney, Agent, or Firm* — Thomas | Horstemeyer, LLP

(57) ABSTRACT

A brake-generator system and associated method including: a rotor secured to a vehicle wheel, the rotor including a housing cylinder and a plurality of magnets affixed to an inner surface of the housing cylinder, where the plurality of magnets are radially arranged with alternating polarity; and a stator fixed to a vehicle wheel axle, the stator including a plurality of steel laminations and a plurality of conductor blocks, each conductor block of the plurality of conductor blocks being disposed in a slot formed in a steel lamination of the plurality of steel laminations; where the plurality of conductor blocks include a plurality of windings for carrying selectively-applied electrical current, such that with the rotor (Continued)

disposed around the stator and current being applied to the plurality of windings, a braking of the vehicle wheel results.

14 Claims, 12 Drawing Sheets

(51) Int. Cl.
    *H02K 7/18*     (2006.01)
    *B60L 7/28*     (2006.01)

(52) U.S. Cl.
    CPC ....... *B60L 2200/10* (2013.01); *B60L 2220/44* (2013.01); *H02K 2213/03* (2013.01)

(56) References Cited

U.S. PATENT DOCUMENTS

| | | | |
|---|---|---|---|
| 9,505,265 B2* | 11/2016 | Fisher | .................. H02K 7/14 |
| 2006/0066167 A1 | 3/2006 | Saito et al. | |
| 2009/0273249 A1 | 11/2009 | Lamperth et al. | |
| 2010/0006699 A1 | 1/2010 | Sullivan | |
| 2017/0025974 A1 | 1/2017 | Phan et al. | |
| 2018/0097431 A1 | 4/2018 | Laldin et al. | |

* cited by examiner

COMBINATION BRAKE-GENERATOR INVERTED MOTOR

CROSS-REFERENCE TO RELATED APPLICATIONS

The present application is a National Phase Application of PCT/US2019/027889, filed Apr. 17, 2019, which claims priority to U.S. Provisional Patent Application No. 62/659, 747, filed Apr. 19, 2018, the disclosures and teachings of which are all incorporated herein by reference.

TECHNICAL FIELD

The present invention generally relates to an inverted motor configured for combined and alternative selective use as a brake and a generator. More specifically, the present invention relates to an inverted motor configured for combined use as a brake-generator in a vehicle such as to brake, i.e., slow or stop said vehicle, and to alternatively generate power for moving said vehicle. The present invention also includes the ability to transfer energy to an energy storage device. In the preferred embodiment, the present invention is intended to be used for taxiing/driving the wheel or wheels of an airplane and for needed braking of the same during a controlled landing.

BACKGROUND OF THE INVENTION

Aircraft braking is currently centered around the use of a hydraulically-activated carbon-based set of brake pads and associated braking system. Such a system relies on friction of the brake pads against a rotating plate secured to the wheel to slow and stop the aircraft. It has basic characteristics and similarities to the automobile air cooled carbon pad disc brakes. This type of system provides for limited performance due to the heavy weight of the brakes and hydraulic systems. Moreover, this prior art system for aircraft braking also has high operational, maintenance, repair, logistical, and overhaul costs. Therefore, there is a need for a braking system, especially for aircraft, with improved performance, lower maintenance costs, and greater durability, with the ultimate goal of a near infinite lifespan. Also, providing such a system with the alternative capability of generating and providing power to the aircraft to taxi from the runway to the boarding gate or vice versa would be truly advantageous.

SUMMARY OF THE INVENTION

In general, in one aspect, the invention features a brake-generator system for at least one wheel of a vehicle configured to be disposed in connection with the vehicle's wheel axle, the brake-generator system including: a rotor secured to a wheel of the at least one wheel, the rotor including a housing cylinder and a plurality of magnets affixed to an inner surface of the housing cylinder, where the plurality of magnets are radially arranged with alternating polarity; and a stator fixed to the wheel axle, the stator including a plurality of steel laminations and a plurality of conductor blocks, each conductor block of the plurality of conductor blocks being disposed in a slot formed in a steel lamination of the plurality of steel laminations; where the plurality of conductor blocks include a plurality of windings for carrying selectively-applied electrical current, such that with the rotor disposed around the stator and current being applied to the plurality of windings, a braking of the at least one wheel of the vehicle results.

Implementations of the invention may include one or more of the following features. The plurality of magnets may be a total of twelve magnets. The housing cylinder may be comprised of steel or carbon composite. The plurality of steel laminations may include 36 slots or less. The conductor block of the plurality of conductor blocks may include about twenty copper or other conducting material wires. Two conductor blocks of the plurality of conductor blocks may be disposed in each slot. The two conductor blocks may include one turn to form about twenty subconductors.

In general, in another aspect, the invention features a method for braking at least one wheel of a vehicle and for generating power for driving the same, the method including disposing a brake-generator system in connection with a vehicle's wheel axle, the brake-generator system including: a rotor secured to a wheel of the at least one wheel, the rotor including a housing cylinder and a plurality of magnets affixed to an inner surface of the housing cylinder, where the plurality of magnets are radially arranged with alternating polarity; and a stator fixed to the wheel axle, the stator including a plurality of steel laminations and a plurality of conductor blocks, each conductor block of the plurality of conductor blocks being disposed in a slot formed in a steel lamination of the plurality of steel laminations; where the plurality of conductor blocks include a plurality of windings for carrying selectively-applied electrical current, such that with the rotor disposed around the stator and current being applied to the plurality of windings, a braking of the at least one wheel of the vehicle results; and performing a braking and power generating operation, whereby the brake-generator system serves to both slow or stop the vehicle and to generate power for driving the same, by generating eddy currents between said stator and said rotor from transmission of the selectively-applied electrical current through the plurality of conductor blocks, resulting in a braking of the at least one wheel of the vehicle.

Implementations of the invention may include one or more of the following features. The plurality of magnets may be a total of twelve magnets. The housing cylinder may be comprised of steel or carbon composite. The plurality of steel laminations may include 36 slots or less. The conductor block of the plurality of conductor blocks may include about twenty copper or other conducting material wires. Two conductor blocks of the plurality of conductor blocks may be disposed in each slot. The two conductor blocks may include one turn to form about twenty subconductors.

In general, in another aspect, the invention features a brake-generator system for at least one wheel of a vehicle configured to be disposed in connection the vehicle's wheel axle, the brake-generator system including: at least two cylindrical rotor layers; at least two cylindrical magnetic layers; and at least one cylindrical steel layer; where a steel layer of the at least one cylindrical steel layer is disposed between two magnetic layers of the at least two cylindrical magnetic layers; and where the two magnetic layers are disposed between two rotor layers of the at least two cylindrical rotor layers.

Implementations of the invention may include one or more of the following features. The at least two cylindrical rotor layers may be configured for rotation with said wheel axle of the vehicle, and the at least two cylindrical magnetic layers and the at least one cylindrical steel layer may not be configured for rotation with said wheel axle of the vehicle. The at least two cylindrical magnetic layers and the at least one cylindrical steel layer may be configured for linear relative movement into and out of cylindrical overlap with one another, and the linear relative movement may be accomplished by a hydraulic mechanism, an electric servo-mechanism, or an electric actuator mechanism. The at least two cylindrical rotor layers may be a total of three rotor layers. The at least two cylindrical magnetic layers may be a total of four magnetic layers. The at least one cylindrical steel layer may be a total of two steel layers.

DETAILED DESCRIPTION OF THE INVENTION, THE PREFERRED EMBODIMENT AND THE DRAWINGS

Figure 1:
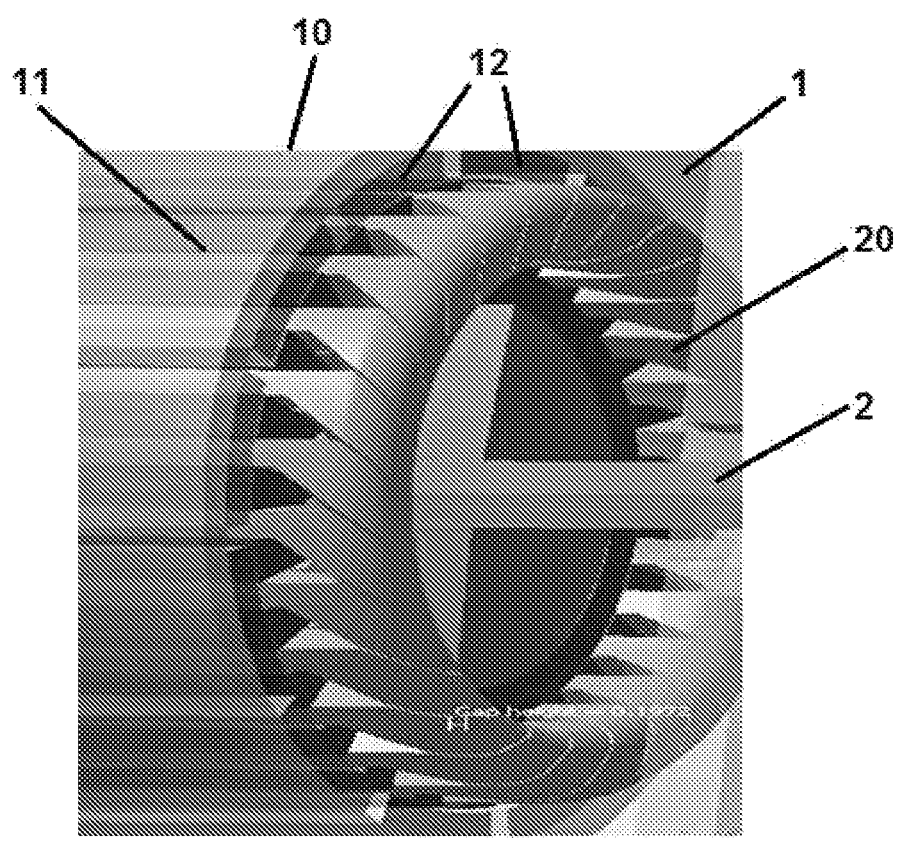
FIG. 1 shows a front perspective view color illustration of a brake-generator system of a first embodiment of the present invention.
Figure 2:
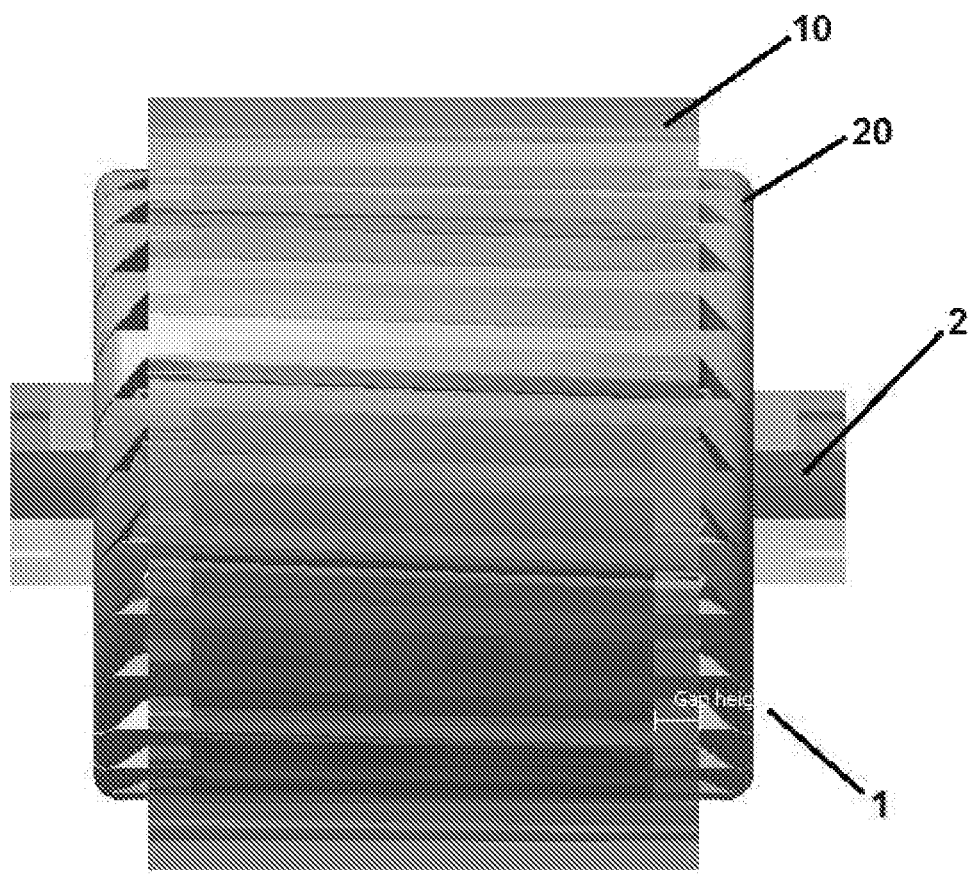
FIG. 2 shows a side view color illustration of the brake-generator system of FIG. 1.

The present invention is directed to an inverted motor configured for combined and alternative selective use as a brake for wheels and as a generator for driving the wheels. This inverted motor utilizes magnets and induced eddy currents to provide braking forces, which differs from current friction-based carbon pad wheel braking systems. Moreover, this inverted motor can be fitted into existing spaces previously housing components of traditional frictional braking systems, providing a braking system that is lighter and requires significantly anticipated less maintenance and repair than frictional braking systems.

In a first embodiment of the present invention, illustrated in FIGS. 1-4, a rotating wheel brake-generator system 1 is set around a vehicle wheel axle 2. Brake-generator system 1 includes a rotor 10 and a stator 20. Rotor 10 includes a housing cylinder 11 and one or more magnets 12 (shown in alternative blue and red) affixed to an inner surface of the housing cylinder 11. This embodiment is directed to a twelve pole, three phase winding. In this embodiment, the one or more magnets 12 are twelve total permanent magnets and disposed in a configuration of alternating polarity.

Housing cylinder 11 may be composed of steel or carbon composite, and may have a thickness of about 0.75 inches. Additionally, an outer surface of housing cylinder 11 may be shaped such as to be capable of sliding into the inner area of the wheel rim of the relevant vehicle, into contact with said wheel rim, and ultimately affixed to the wheel unit of said vehicle. As a result of being affixed to the wheel unit, rotor 10 of brake-generator system 1 is capable of rotation upon rotation of the wheel or tire and rim of the vehicle. Torque from the vehicle may then be transferred from the wheel carrying the tire to rotor 10 and vice versa, i.e., slowing rotation of rotor 11 by action of stator 20 will serve as a brake to rotation of the wheel unit.

Figure 3:
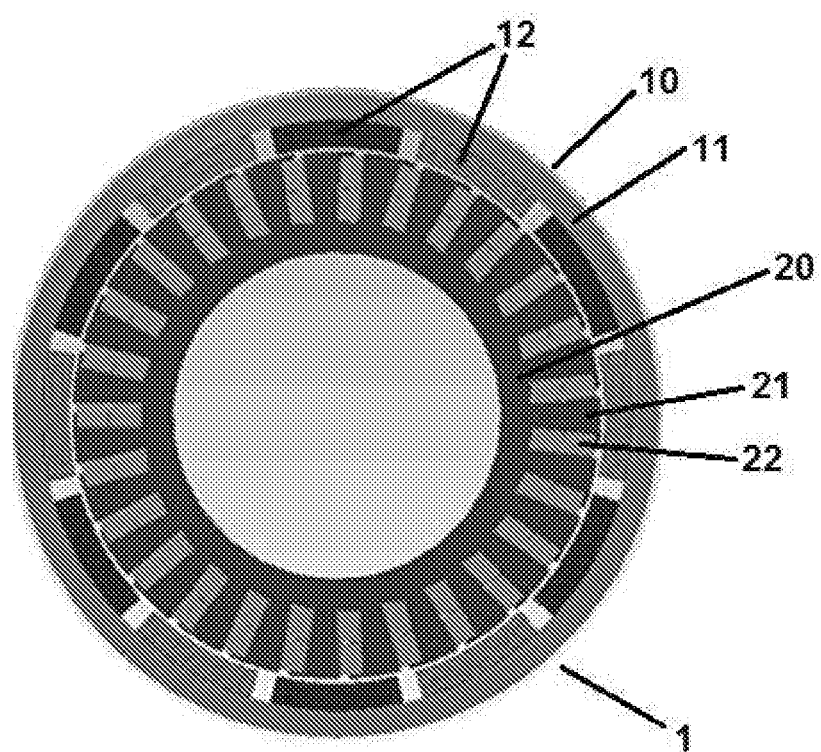
FIG. 3 shows a front view color illustration of the brake-generator system of FIG. 1.
Figure 4:
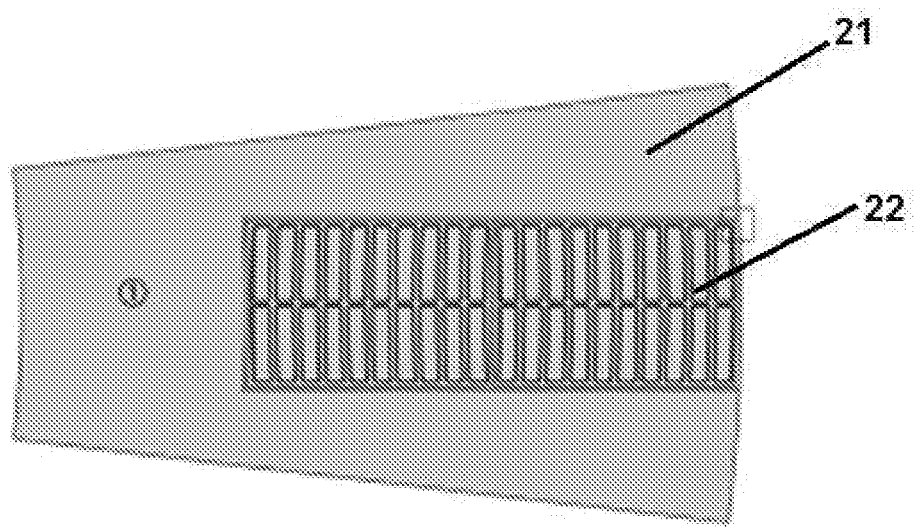
FIG. 4 shows a front view color illustration of a stator slot including conductor blocks of the brake-generator system of FIG. 1.

Stator 20, which is fixedly secured to the aircraft, may include steel laminations 21 and conductor blocks 22 (See FIG. 3). Steel laminations 21 are radially stacked to form the core of stator 20. In this embodiment, there are 36 slots or less disposed in the steel laminations 21. The slots have approximate dimensions of 0.553" by 1.5745". In each of these slots, there are two conductor blocks 22. In this embodiment, each conductor block 22 includes twenty copper or other conducting material wires. In one embodiment, the two conductor blocks make one turn, with ten turns per coil/half slot and twenty subconductors per block. Stator 20 may be slid onto and affixed to vehicle axle 2, such as by being bolted to a hub of axle 2. Stator 20 preferably does not move or rotate. Rather, the rotor rotates about it. Subsequent to attachment of stator 20 to axle 2, the rotor 10 assembly including the wheel and tire unit attached thereto may be slid onto and rotatively affixed to axle 2 by surrounding stator 20.

In a braking operation of the aircraft brake-generator system 1, magnets 12 of the rotor initially rapidly rotate around stator 20. When current is then applied to the windings, eddy currents are produced between the rotor and the stator. These are the braking forces. These eddy currents are transferred through the copper or other conducting material wires of the conductor blocks 22 to resistors disposed in the vehicle, which convert this energy into heat. The eddy currents may also be transferred through the copper or other conducting material wires of conductor blocks 22 to an energy storage device for reuse later in a taxiing operation of the vehicle. Wheel rotation has a direct relationship to resistance in the motor, because resistance must decrease as wheel rotation decreases to maintain a maximum braking force for the motor. During braking, the device may deliver its power to a series of resistors with the help of well-timed insulated-gate bipolar transistors ("IGBTs") or relays. This series resistance may be a three phase resistance whose value is sequenced in a closed control loop to the speed of the aircraft, starting at a high resistance value and ending at zero. In this embodiment, during braking, there may be approximately six or more resistors placed in series. Additionally, the resistors may have values of approximately 2.1, 1.7, 1.3, 0.9, 0.5, and 0.1 ohms (Ω). The highest resistance is the number determined as the ideal resistance at the highest speed, i.e., at aircraft touchdown. As the aircraft slows, the highest resistance is first shorted with an IGBT or a simple relay. Further speed reduction by the aircraft signals the shorting of the next largest resistance. At the lowest speed, all the external resistors are shorted. No wiring changes to the generator are required. The advantage of this mechanism is that the braking action is passive, achieved by shorting the generator to a resistive load.

Additionally, the disclosed brake-generator system 1 may provide for a taxiing operation for the vehicle, in which power stored in the vehicle from the action of braking the same is transferred to stator 20, which drives rotor 10 and accordingly rotates the vehicle wheel and tire unit, permitting the vehicle to move. The copper or other conducting material wires and windings therein of conductor blocks 22 serve to assist the generator function of the brake-generator system 1, such as an induction motor.

Figure 5:
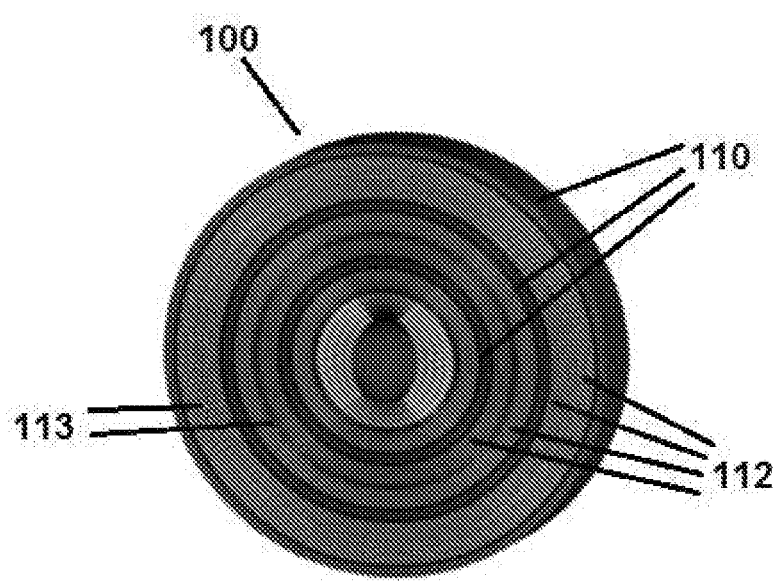
FIG. 5 shows a front perspective and cross-sectional view color illustration of a brake-generator system of a second embodiment of the present invention.
Figure 6:
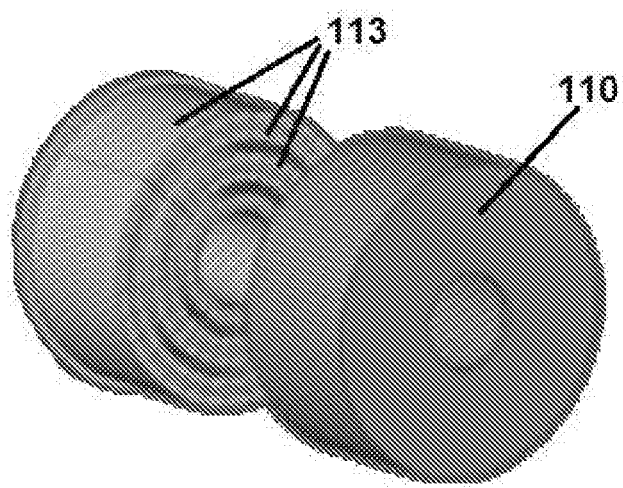
FIG. 6 shows a front perspective view illustration of components, shown in different colors, of the brake-generator system of FIG. 5.
Figure 7:
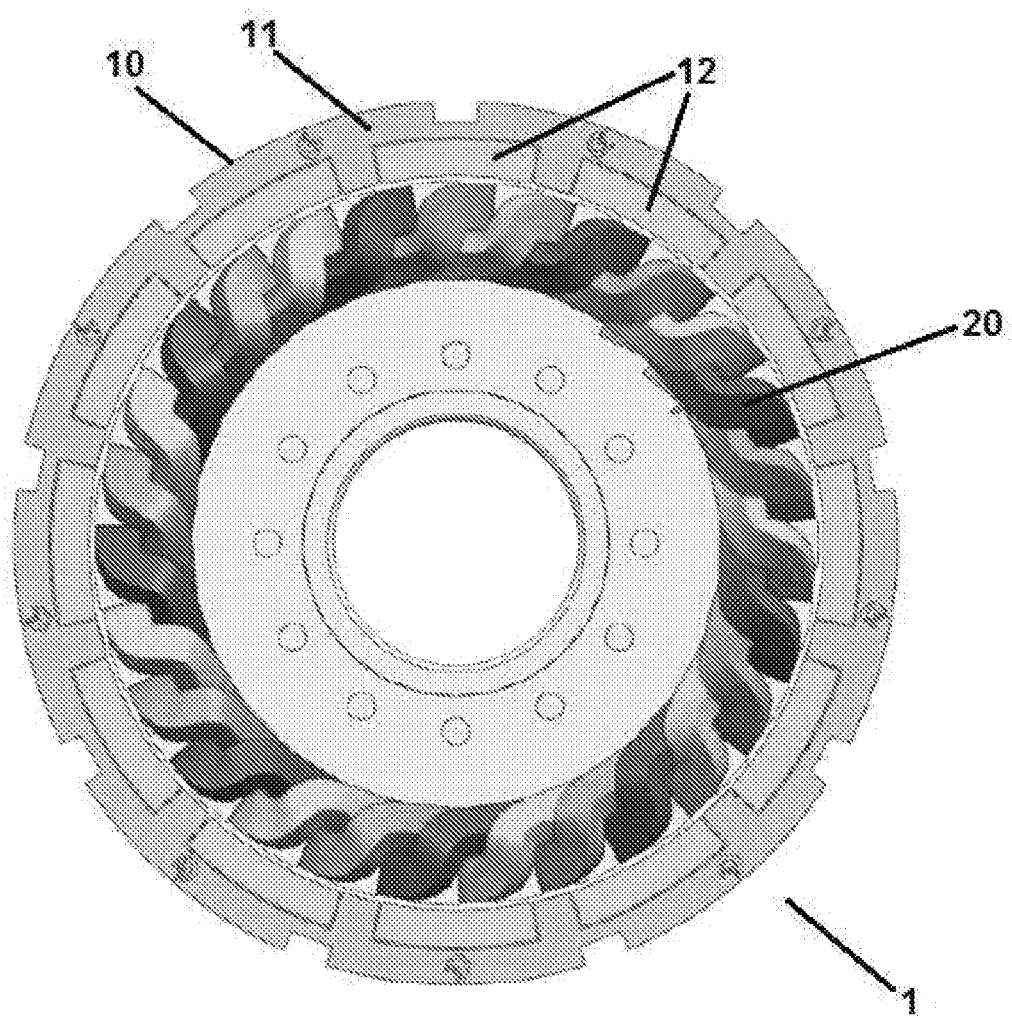
FIG. 7 shows a front view color illustration of a brake-generator system of a third embodiment of the present invention.
Figure 8:
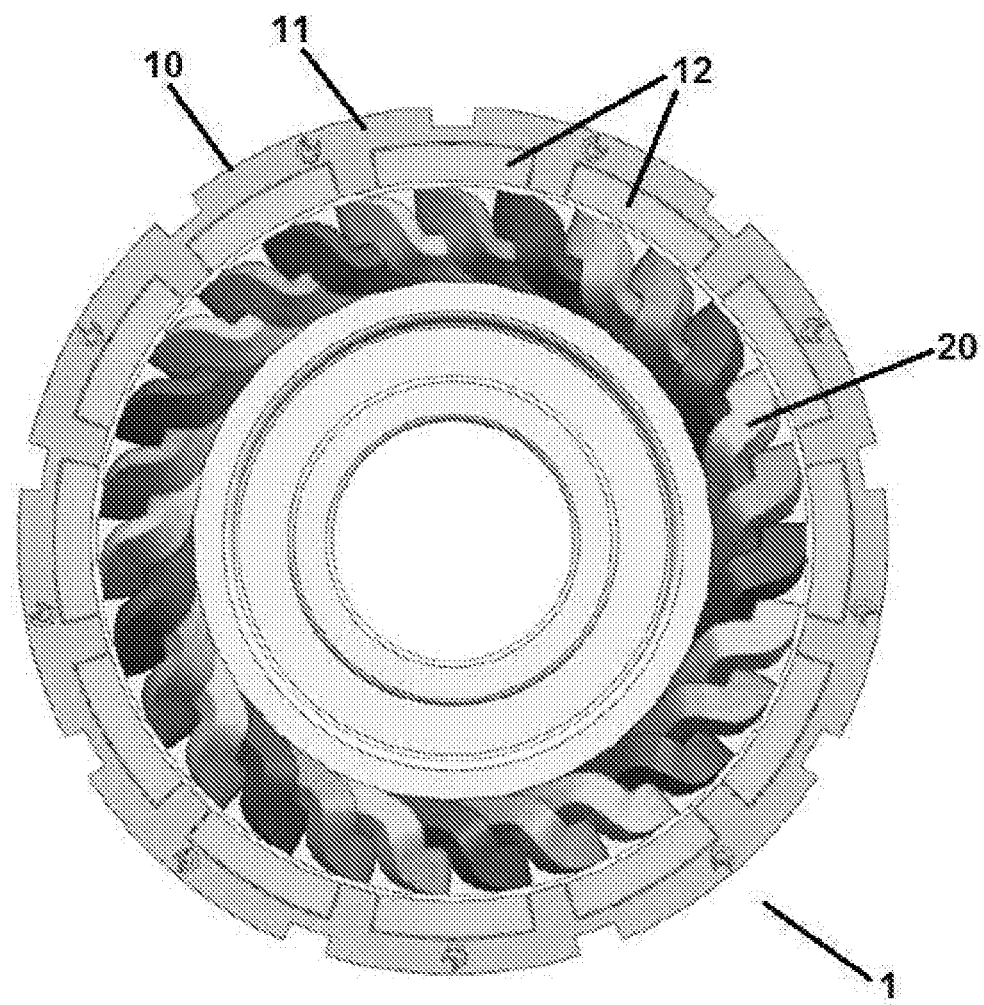
FIG. 8 shows a back view color illustration of the brake-generator system of FIG. 7.
Figure 9:
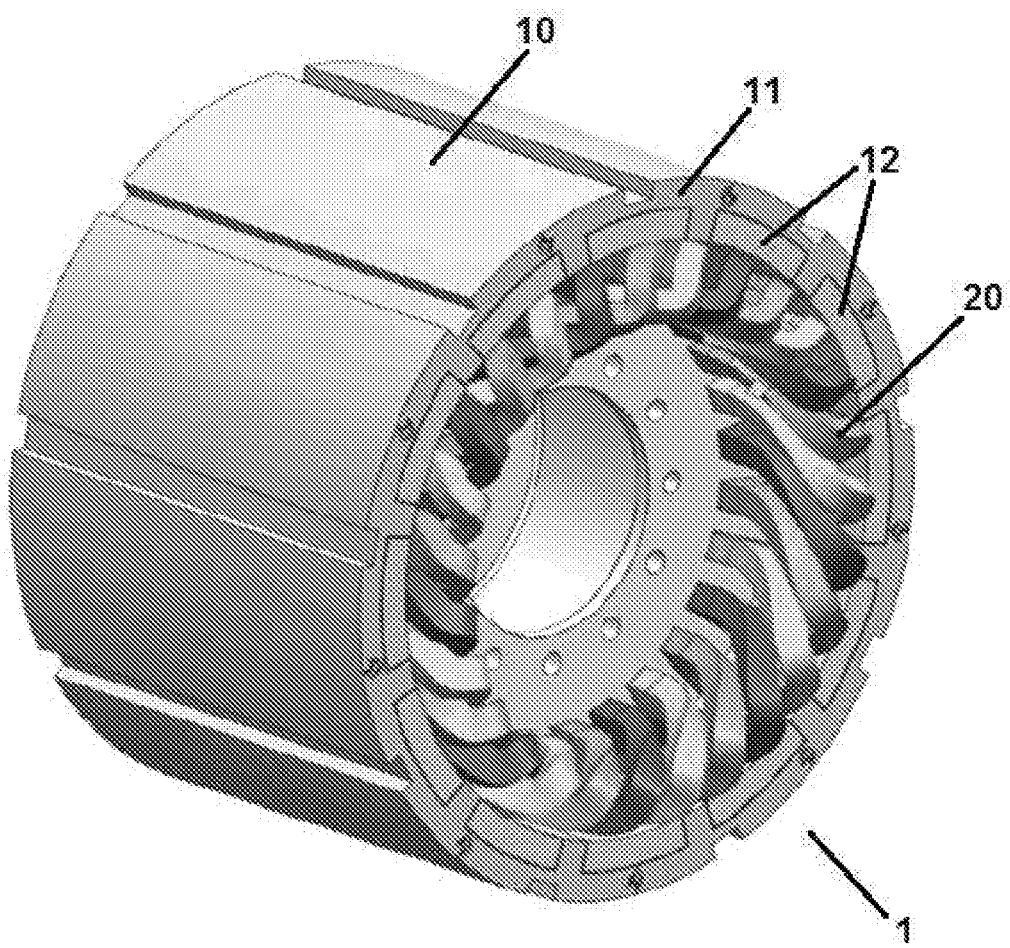
FIG. 9 shows a front perspective view color illustration of the brake-generator system of FIGS. 7 and 8.

In a second embodiment of the present invention, illustrated in FIGS. 5-6, a brake-generator system 100 includes multiple layers of varied compositions. Specifically, brake-generator system 100 includes at least one cylindrical rotor 110, one or more radially separated and cylindrical magnetic layers 112, and one or more interspaced and cylindrical steel layers 113. Rotor 110 is preferably composed of aluminum or red brass.

Magnetic layers 112 and steel layers 113 preferably do not rotate, e.g., they are fixed to the aircraft. Layers 112 and 113 are moved linearly, e.g., by a hydraulic mechanism, an electric servo-mechanism, or an electric actuator mechanism, such that these layers shadow the rotating rotor 110. In doing so, layers 112 and 113 generate eddy currents within the rotating rotor 110, which in turn produce selective and controlled braking forces on rotor 110. The rotor is secured to the wheel such that when the wheel and associated tire rotate, the rotor rotates. An increase in the number of magnetic layers 112 shadowing rotor 110 results in an increase in the amount of braking force capable of being generated. FIG. 6 illustrates the rotor 110 and the axially-slid additional brake components, such as steel layers 113, as separate components.

In a third embodiment of the present invention, illustrated in FIGS. 7-12, a brake-generator system 1 is set around a vehicle axle 2. See FIGS. 11 and 12. Brake-generator system 1 includes a rotor 10 and a stator 20. Rotor 10 includes a housing cylinder 11 and one or more interior and spaced magnets 12 affixed to an inner surface of housing cylinder 11. The rotor 10 is preferably secured to the inside of the wheel carrying the tire and rotates therewith. This embodiment is also directed to a twelve pole, three phase brake with the three phases shown in different colors (light blue, dark blue, and green) for ease of illustration. In this embodiment, the one or more magnets 12 are also twelve total permanent magnets and disposed in a configuration of alternating polarity. The magnets 12 reside on the inside of the housing cylinder 11.

Figure 10:
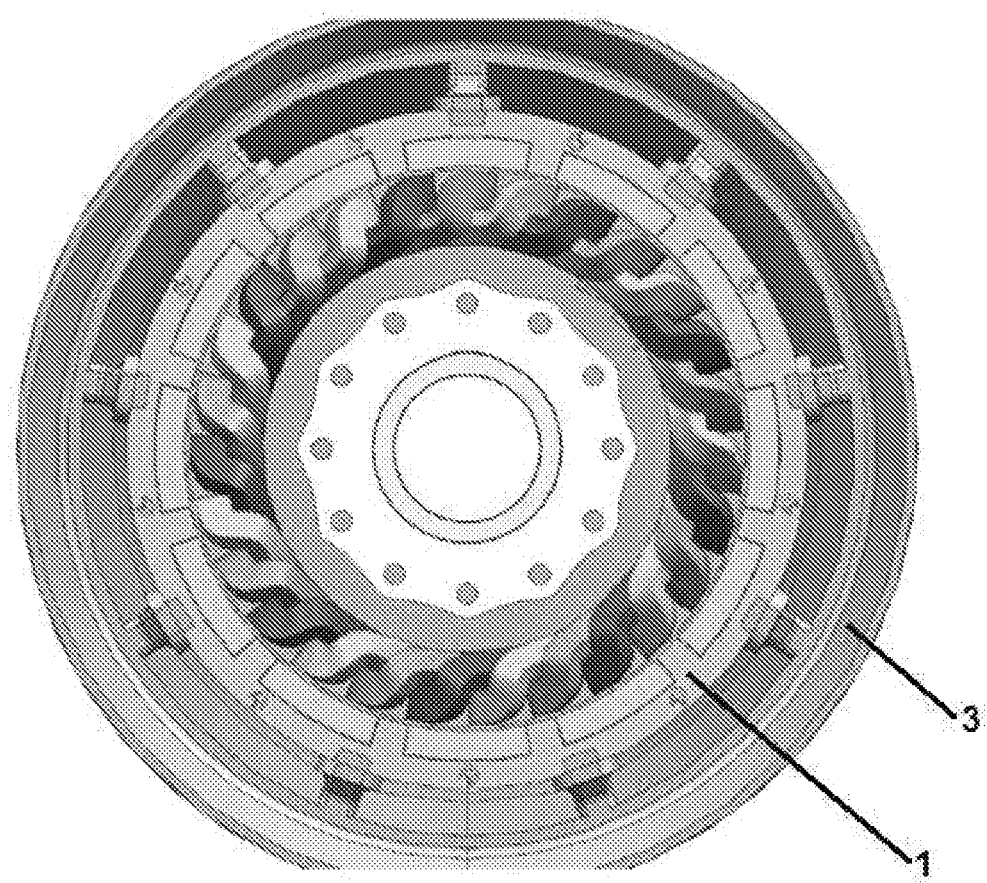
FIG. 10 shows a front view color illustration of the brake-generator system of FIG. 7 included in a vehicle wheel rim.

An outer surface of housing cylinder 11 may be shaped such as to be capable of sliding into the inner area of the vehicle's wheel rim, such as rim 3 shown in FIG. 10, and thus into contact with said wheel rim, and ultimately affixed to the wheel unit of said vehicle. As a result of being affixed to said wheel unit, rotor 10 and the magnets 12 of brake-generator system 1 is capable of rotation upon rotation of the wheel, tire, and rim of said vehicle. The rotor 10 may have an approximate length of about 12.5" (from cylinder end to opposed cylinder end), which may be approximately 2" longer than the length of stator 20. A longer rotor 10 is able to overhang stator 20 and protect the end windings while also providing a braking force.

Figure 11:
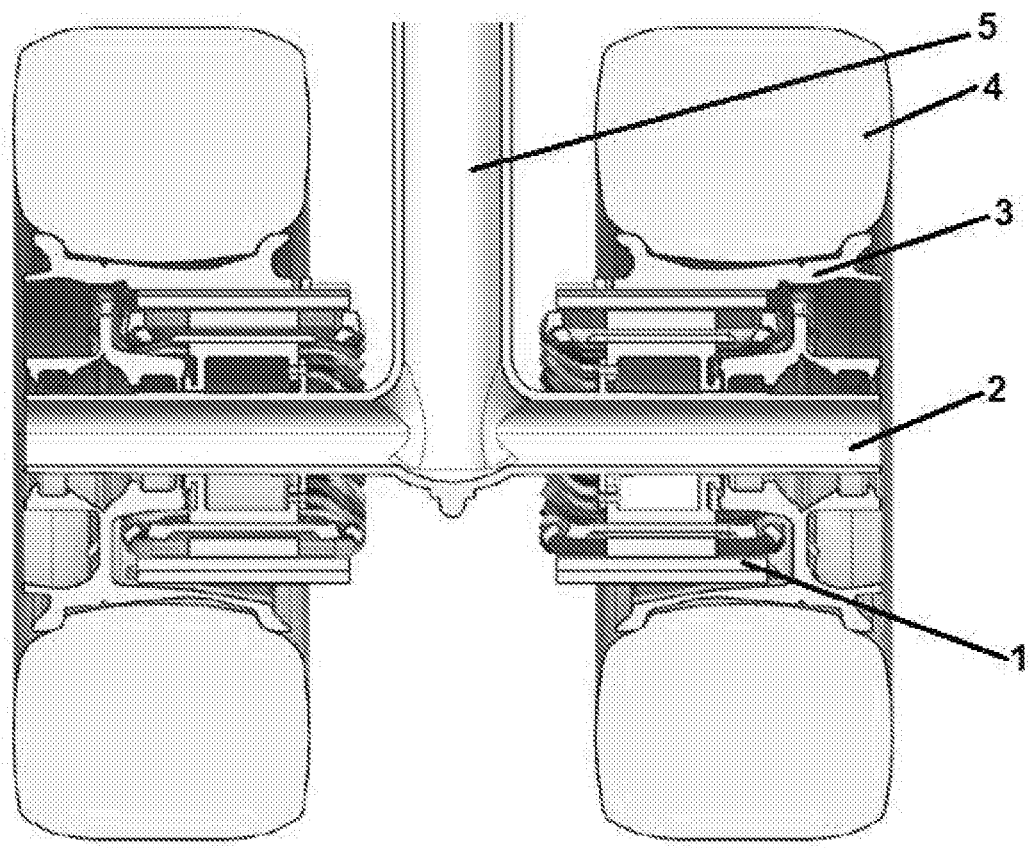
FIG. 11 shows a side cross-sectional view color illustration of the brake-generator system of FIG. 7 included in a vehicle, preferably an aircraft's main landing gear and/or other support wheels and tires.
Figure 12:
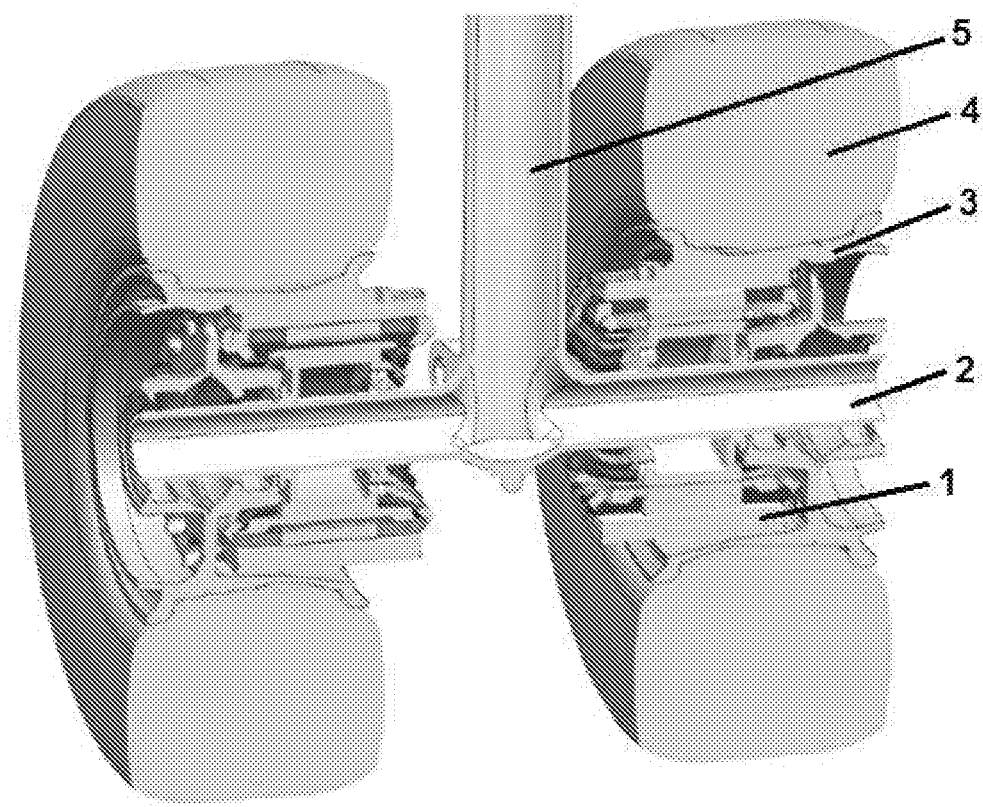
FIG. 12 shows a side perspective and cross-sectional view color illustration of the brake-generator system of FIGS. 7 and 11, as included in an aircraft.

Stator 20 may include steel laminations 21 and conductor blocks 22, as shown in the embodiment reflected in FIG. 3. Steel laminations 21 are radially stacked to form the core of stator 20. In this embodiment, there are 36 slots or less disposed in steel laminations 21. The slots have approximate dimensions of 0.553" by 1.5745". In each of these slots, there are two conductor blocks 22, similar to the embodiment reflected in FIG. 3. In this embodiment, each conductor block 22 includes twenty copper or other conducting material wires. In one embodiment, the two conductor blocks make one turn, with ten turns per coil/half slot and twenty subconductors per block. As illustrated in FIGS. 11 and 12, stator 20 may be slid onto and affixed to vehicle axle 2 such as by being bolted to a hub of axle 2. Stator 20 preferably does not move or rotate. Stator may have an approximate inner diameter of 10.5" and an outer diameter of 14.55". Subsequent to attachment of stator 20 to axle 2, the rotor 10 assembly including the wheel and tire unit attached thereto may be slid onto and affixed to axle 2 via stator 20. The thickness of stator 20 may be approximately 10.5".

Stator 20 may be slid onto and affixed to vehicle axle 2, such as by being bolted to a hub of axle 2 or affixed to axle 2 via bearings. Stator 20 preferably does not move or rotate. Subsequent to attachment of stator 20 to axle 2, the rotor 10 assembly including the wheel and tire unit attached thereto may be slid onto and affixed around axle 2 by stator 20 located within its center. When the braking mechanism of the aircraft is applied, current may flow through the windings of the stator to produce eddy currents to brake or slow the rotation of the rotor, to which the wheel and the tire are attached. This results in braking of the vehicle. The heat and/or energy of the operation of braking can be stored for later use in driving the vehicle. This can be especially useful in taxiing an aircraft from the runway to the boarding gate or vice versa.

FIGS. 11-12 illustrate an embodiment in which brake-generator system 1 is utilized in an aircraft vehicle having axle 2, wheel rim 3, wheel tire 4, and support leg 5. Usage of the present invention in an aircraft vehicle is a desired embodiment, given the deficiencies of current friction-based braking systems and the benefits associated with the present invention. However, the present invention is not limited in application to only aircraft vehicles. Automobiles may be outfitted with a brake-generator system of the present invention and, in doing so, may also generate energy as a result of braking. Trains, such as long haul heavy rail trains or short haul commuter trains, may also utilize the present invention with the benefits of carbon footprint and maintenance cost reductions. One additional example would be elevators, which can use the present invention to recapture expended energy, otherwise consumed during braking, thereby increasing operational efficiency. These embodiments are not intended to limit usage of the present invention but are merely examples illustrating the broad applicability of this technology.

Finally, the present invention, utilizing eddy currents from magnets and windings with current to provide braking forces, may be combined with traditional friction-based braking systems and/or materials, e.g., carbon materials, to form a hybrid braking system.

The embodiments and examples above are illustrative, and many variations can be introduced to them without departing from the spirit of the disclosure. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the accompanying drawings and descriptive matter in which there are illustrated exemplary embodiments of the invention.

What is claimed is:

1. A brake-generator system for at least one wheel of a vehicle configured to be disposed in connection with the vehicle's wheel axle, the brake-generator system comprising:
   a rotor secured to a wheel of the at least one wheel, the rotor comprising a housing cylinder and a plurality of magnets affixed to an inner surface of the housing cylinder, wherein the plurality of magnets are radially arranged with alternating polarity; and
   a stator fixed to the wheel axle, the stator comprising a plurality of steel laminations and a plurality of conductor blocks, each conductor block of the plurality of conductor blocks being disposed in a slot formed in a steel lamination of the plurality of steel laminations;
   wherein the plurality of conductor blocks include a plurality of windings for carrying selectively-applied electrical current, such that with the rotor disposed around the stator and current being applied to the plurality of windings, a braking of the at least one wheel of the vehicle results; and
   wherein the brake-generator system is configured to both slow or stop the vehicle and to generate power for driving the same, by generating eddy currents between said stator and said rotor from transmission of the selectively-applied electrical current through the plurality of conductor blocks, resulting in a braking of the at least one wheel of the vehicle.

2. The brake-generator system of claim 1, wherein the plurality of magnets is a total of twelve magnets.

3. The brake-generator system of claim 1, wherein the housing cylinder is comprised of steel or carbon composite.

4. The brake-generator system of claim 1, wherein the plurality of steel laminations include 36 slots or less.

5. The brake-generator system of claim 1, wherein the conductor block of the plurality of conductor blocks includes about twenty copper or other conducting material wires.

6. The brake-generator system of claim 5, wherein two conductor blocks of the plurality of conductor blocks are disposed in each slot.

7. The brake-generator system of claim 6, wherein the two conductor blocks include one turn to form about twenty subconductors.

8. A method for braking at least one wheel of a vehicle and for generating power for driving the same, the method comprising:
   disposing a brake-generator system in connection with a vehicle's wheel axle, the brake-generator system comprising:
      a rotor secured to a wheel of the at least one wheel, the rotor comprising a housing cylinder and a plurality of magnets affixed to an inner surface of the housing cylinder, wherein the plurality of magnets are radially arranged with alternating polarity; and
      a stator fixed to the wheel axle, the stator comprising a plurality of steel laminations and a plurality of conductor blocks, each conductor block of the plurality of conductor blocks being disposed in a slot formed in a steel lamination of the plurality of steel laminations;
      wherein the plurality of conductor blocks include a plurality of windings for carrying selectively-applied electrical current, such that with the rotor disposed around the stator and current being applied to the plurality of windings, a braking of the at least one wheel of the vehicle results; and
   performing a braking and power generating operation, whereby the brake-generator system serves to both slow or stop the vehicle and to generate power for driving the same, by generating eddy currents between said stator and said rotor from transmission of the selectively-applied electrical current through the plurality of conductor blocks, resulting in a braking of the at least one wheel of the vehicle.

9. The method of claim 8, wherein the plurality of magnets is a total of twelve magnets.

10. The method of claim 8, wherein the housing cylinder is comprised of steel or carbon composite.

11. The method of claim 8, wherein the plurality of steel laminations include 36 slots or less.

12. The method of claim 8, wherein the conductor block of the plurality of conductor blocks includes about twenty copper or other conducting material wires.

13. The method of claim 12, wherein two conductor blocks of the plurality of conductor blocks are disposed in each slot.

14. The method of claim 13, wherein the two conductor blocks include one turn to form about twenty subconductors.

* * * * *